United States Patent

Taki et al.

[11] Patent Number: 6,088,182
[45] Date of Patent: Jul. 11, 2000

[54] RECORDING MEDIUM CARTRIDGE RECORDING/REPRODUCING APPARATUS USING A RECORDING MEDIUM CARTRIDGE AND INFORMATION MANAGEMENT SYSTEM

[75] Inventors: Yoshitsugu Taki; Hitoshi Rikukawa; Toshiya Kurokawa; Masahiro Kodama; Takao Hiramoto; Yoshihisa Takayama, all of Kanagawa, Japan

[73] Assignee: Sony Corporation, Tokyo, Japan

[21] Appl. No.: 08/989,382

[22] Filed: Dec. 12, 1997

[30] Foreign Application Priority Data

Dec. 13, 1996 [JP] Japan .................................. 8-353004
Apr. 18, 1997 [JP] Japan .................................. 9-101890

[51] Int. Cl.$^7$ .................................................. G11B 15/68
[52] U.S. Cl. ............................... 360/71; 360/92; 360/132
[58] Field of Search ................................. 360/71, 69, 92, 360/132; 369/58

[56] References Cited

U.S. PATENT DOCUMENTS

| | | | |
|---|---|---|---|
| 4,644,425 | 2/1987 | Tamaki | 360/71 X |
| 5,369,641 | 11/1994 | Dodt et al. | 360/69 X |
| 5,502,702 | 3/1996 | Nakajo | 369/58 |
| 5,758,013 | 5/1998 | Kizu et al. | 360/22 X |
| 5,819,309 | 10/1998 | Gray | 360/134 X |
| 5,867,335 | 2/1999 | Ozue et al. | 360/71 |

Primary Examiner—Paul Loomis
Assistant Examiner—James L Habermehl
Attorney, Agent, or Firm—Jay H. Maioli

[57] ABSTRACT

A recording medium cartridge has a bar code label provided on the outer surface of its case so that the bar code of the bar code label indicates identification information associated the with recording medium disposed in the case. A memory circuit is provided inside the case so that identification information identical to the information indicated by the bar code label may be stored in the memory circuit. A recording/reproducing apparatus includes a bar code reader for reading the bar code of the bar code label, and a memory reader for reading the identification information stored in the memory circuit. Either the identification information read by the bar code reader or the identification information read by the memory reader is employed as the identification information associated with the recording medium cartridge. If the bar code cannot be read for some reason such as degradation of the bar code label, the identification information read from the memory circuit is employed as the identification information associated with the recording medium cartridge. This ensures that the identification information can be managed in a highly reliable fashion.

15 Claims, 12 Drawing Sheets

RECORDING MEDIUM CARTRIDGE RECORDING/REPRODUCING APPARATUS USING A RECORDING MEDIUM CARTRIDGE AND INFORMATION MANAGEMENT SYSTEM

BACKGROUND OF THE INVENTION

1. Field of the Invention

The present invention relates to a recording medium cartridge having identification information for identifying the recording medium, a recording/reproducing apparatus which operates with such a cartridge, and an information management system which includes a plurality of recording medium cartridges and which records or reproduces information on or from the recording medium of a particular recording medium cartridge in response to a command given from an external controller.

2. Description of the Related Art

A recording medium such as a magnetic disk (hard disk, flexible disk) or a magnetic tape is widely used in a computer system. An information management system is known in the art which manages information by recording and reproducing a great amount of information on or from recording media via a plurality of drive units.

In an information management system using magnetic tapes serving as recording media (hereinafter referred to as a tape library system), a great number of tape cassettes are placed in a rack, and a desired tape cassette is taken, as required, out of the rack by a transfer mechanism and it is loaded on a tape drive unit properly selected from a plurality of tape drive units thereby recording or reproducing information.

The tape library system includes control means which communicates with an external control device such as a host computer. In response to a command from the external control device, the tape library system reproduces requested information from a magnetic tape via a tape drive unit and provides the reproduced information to the external control device, or records information on a magnetic tape.

If such a tape library system includes a great number of, and various types of, tape cassettes each containing a magnetic tape, it is necessary to manage tape cassettes in accordance with not only the contents of information stored on the magnetic tape of each tape cassette but also identification information for identifying each tape cassette (such as the title, the type, and the format of each tape cassette) indicated on the outer surface of each tape cassette.

One known technique to meet the above requirement is to put a bar code label indicating identification information on each tape cassette in a similar manner to bar code information provided on books for managing a book library so that the bar code information is read by a reader provided on a tape cassette recording/reproducing apparatus thereby managing the tape cassettes.

However, the bar code label provided on the outer surface of a tape cassette is degraded after long-time use. The degradation can result in difficulty of reading the identification information, and thus it becomes necessary to read it a great number of times. At worst, it becomes impossible to read identification information at all.

When degradation occurs to a great extent, it is needed to replace the bar code label with a new label by a manual operation which is very troublesome. For example, if a bar code label is degraded to such a degree that no information can be read by visual inspection, it is required to put a correct bar code label on a tape cassette after checking the content of the tape cassette.

SUMMARY OF THE INVENTION

In view of the above, it is an object of the present invention to provide a highly reliable technique of detecting identification information of a recording medium cartridge.

According to an aspect of the present invention, to achieve the above object, there is provided a recording medium cartridge including: an identification indicating part provided on the outer surface of a case, the identification indicating part serving to represent identification information for identifying a recording medium disposed inside the case; and an identification information storage disposed inside the case, the identification information storage serving to store information which is the same as or equivalent to the information represented by the identification indicating part. According to another aspect of the invention, there is provided a recording/reproducing apparatus which operates using such a recording medium cartridge, wherein the recording/reproducing apparatus comprises: first reading means for reading the identification information from the identification indicating part; second reading means for reading the identification information stored in the identification information storage; recording/reproducing means for recording or reproducing information on or from the recording medium disposed in the recording medium cartridge; and identification information decision means for employing either the identification information read by the first reading means or the identification information read by the second reading means as the identification information associated with the recording medium in the recording medium cartridge. According to another aspect of the invention, there is provided an information management system which includes a plurality of such recording medium cartridges for managing a great amount of information.

In the present invention, even if the information indicated by the identification indicating part provided on the outer surface of the case is degraded to such an extent that the information cannot be read, it is still possible to identify the recording medium by reading information from the identification information storage disposed inside the case. This ensures that the identification information can be managed in a more reliable fashion than can be achieved using recording medium cassettes with only an identification indicating part which is easily contaminated or damaged during handling.

Preferably, the identification indicating part is realized by a bar code. This makes it possible to easily read the identification information. Furthermore, the identification information storage may be realized by a memory circuit disposed in the case. This makes it possible to realize the identification information storage in a small form, thus resulting in a reduction in the installation space.

In the present invention, because the identification information read by the first or second reading means is employed as the identification information associated with the recording medium of the recording medium cartridge, it is possible to manage the identification information in a more reliable fashion than can be achieved using only the identification indicating part which is easily damaged during handling.

Preferably, the bar code information read by the first reading means or the information read from the memory circuit by the second reading means may be employed is employed as the identification information associated with the recording medium of the recording medium cartridge, thereby ensuring that the identification information can be managed in a more reliable fashion than can be achieved using only the identification indicating part which is easily damaged during handling.

Preferably, before the recording/reproducing unit starts to record or reproduce information on or from the recording medium disposed in the recording medium cartridge, the identification information is read by the first or second reading means and the detected information is employed as the identification information associated with the recording medium of the recording medium cartridge thereby making it possible to detect the identification information of the recording medium cartridge using the first or second reading means without having to reproduce the contents recorded on recording medium.

Even when the identification indicating part has been degraded to such an extent that the information thereof cannot be read by the first reading means, if the second reading means can read information from the identification information storage, then the detected information can be employed as the identification information associated with the recording medium cartridge.

In the case where the identification indicating part is realized by a bar code, even when the bar code cannot be read by the first reading means due to degradation (such as contamination, damage, separation) or due to an inadequate manner of attaching the bar code label, if the second reading means can read information from the memory circuit, then the detected information can be employed as the identification information associated with the recording medium cartridge.

When the first reading means cannot read the identification information of the identification indicating part, the lost identification information of the identification indicating part can be recovered by storing information, which is the same as the information read from the identification information storage and stored in the second storage means, into the first storage means.

When the identification information of the identification indicating part is compared with the identification information stored in the identification information storage, if it is determined that these two pieces of information are not identical to each other, the identification information obtained via the second reading means can be employed as the identification information associated with the recording medium thereby improving the reliability of the detected identification information.

When information of a plurality of recording medium cartridges placed in a cartridge storage rack is managed, poor reliability of the operation of reading the identification indicating part of a recording medium cartridge can be compensated for by the identification information storage thereby ensuring that the identification information of each recording medium cartridge can be managed in a highly reliable fashion.

When a recording medium cartridge whose identification information has not been identified yet is placed into the information management system, the identification information of the identification indicating part and that of the identification information storage of the recording medium cartridge are preferably read before recording or reproducing information on or from the recording medium located in the recording medium cartridge thereby achieving rapid detection of the identification information thus achieving efficient management.

After turning on the electric power of the information management system, the identification information of recording medium cartridge stored in the cartridge storage rack is preferably read, and the detected information is compared with the identification information which was stored before the electric power was turned on. If inconsistency in information is detected, the identification information is updated thereby ensuring at that the identification information of each recording medium cartridge is managed in a reliable fashion.

Control information including information indicating the manufacturer or attribute information of recording medium cartridges may be stored in the identification information storage, thereby making it possible to quickly obtained control information without having to detect the control information by reading the content recorded on the recording medium of the cartridge.

BRIEF DESCRIPTION OF THE DRAWINGS

FIG. 6 illustrates, together with FIGS. 7–15, an embodiment of the present invention, wherein FIG. 6 is a schematic diagram illustrating a tape cassette having identification information;

FIG. 10 illustrates, together with FIGS. 11 and 12, an example of the structure of a mechanism for reading the identification information of a tape cassette, wherein FIG. 10 illustrates a tape cassette which is to be taken out from the cassette storage rack using a hand block;

DESCRIPTION OF THE PREFERRED EMBODIMENT

Figure 1:
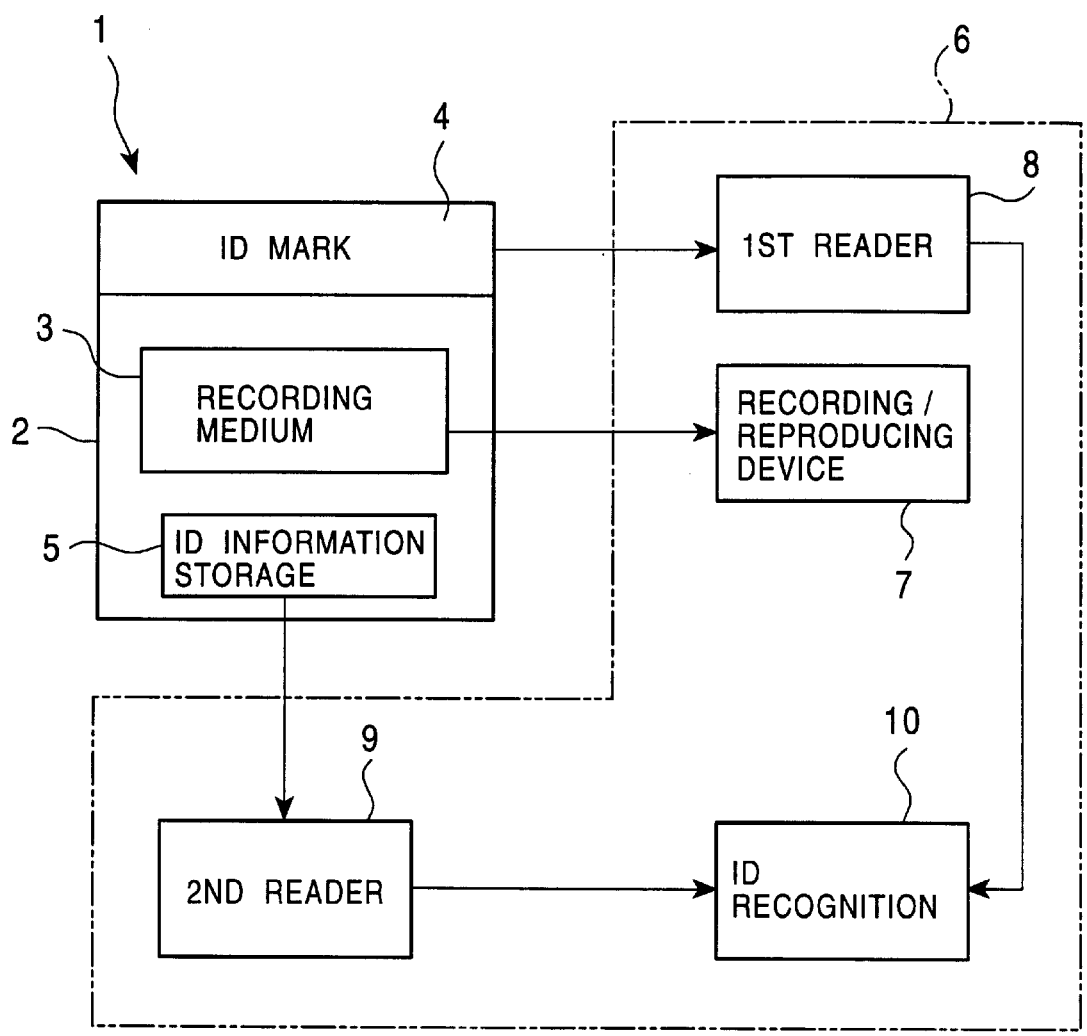
FIG. 1 is a block diagram illustrating the concept of the basic structure of a recording medium cartridge and a recording/reproducing apparatus using such a recording cartridge, according to the present invention.

FIG. 1 is a conceptual diagram illustrating the basic constructions of a recording medium cartridge and a recording/reproducing apparatus which operates using such a recording medium cartridge. A recording medium 3 is placed inside a case 2 of a recording medium cartridge 1. Various types of media such as a magnetic or magneto-optic recording medium may be employed as the recording medium 3. The recording medium 3 may be constructed in any desired form such as a disk, a tape, or memory card.

An identification indicating part 4 indicating identification information for identifying the recording medium 3 is formed on the outer surface of the case 2. The identification information may include various kinds of information such as the title of the recorded content, the type and/or format of the recording medium, and the recording scheme employed. The identification information may be given in various forms for example a pattern such as a bar code or a symbol such as a character, mark, or numeral. Although various techniques such as an optical or magnetic (or magneto-optic) detection technique may be employed to detect the identification information, the optical detection technique is more desirable in that it has high resistance to an external magnetic disturbance and in that it can be handled easily as is the case with bar code information.

Inside the case 2, there is an identification information storage 5 for storing identification information representing the same content as that represented by the identification indicating part 4. The identification information storage 5 is designed to be capable of keeping the identification information for a longer period of time than can be kept by the identification indicating part 4, so that when the identification indicating part 4 is degraded to such an extent that identification information cannot be read, the recording medium 3 can be identified by reading information from the identification information storage 5. The identification information storage 5 may be realized using for example a nonvolatile memory circuit to store identification information. This makes it possible to reduce the size of the identification information storage 5, thus reducing the installation space for it. The identification information storage 5 may be realized on a part of the recording medium 3. For example, identification information may be recorded in a particular recording area of the recording medium 3. However, in this case, to read the identification information, it is required to use the same device as that used to reproduce normal information from the recording medium 3. Instead, it is more desirable to provide an identification information storage 5 separately from the recording medium 3 so that the identification information can be read easily.

The bar code information of the identification indicating part may include control information indicating the manufacturer of the recording medium cartridge or attribute thereof and also indicating number information indicating a number uniquely assigned to each recording medium cartridge. The identification information storage has a management area for storing information which is the same as or equivalent to those of the control information of the bar code information, and also has a number area for storing information which is the same as or equivalent to the number information of the bar code information. This makes it possible to detect control information more efficiently than in the case where control information is recorded on the recording medium disposed in the recording medium cartridge. Furthermore, this technique allows an expansion of bar code information as required.

The reason why two identification means, that is, both identification indicating part 4 and identification information storage 5 are provided in the recording medium cartridge 1 is to achieve both high reliability of the identification information and ease of handling the recording medium cartridge. If there were only the identification information storage 5, there would be a problem of difficulty of handing the recording medium cartridge although the requirement of high reliability of identification information would be satisfied.

The recording/reproducing apparatus 6 includes recording/reproducing means 7 for recording and reproducing information on or from the recording medium 3. For example, in the case where a magnetic tape or a magnetic disk is employed as the recording medium 3, a driving device having a magnetic head may be employed as the recording/reproducing means 7. The recording/reproducing apparatus 6 may be constructed in either such a manner that both recording and reproducing are possible or in such a manner that only reproducing or recording is possible.

The identification information of the identification indicating part 4 is read by a first reader 8 and the identification information stored in the identification information storage 5 is read by a second reader 9. The first an d second readers 8 and 9 for reading identification information may be of either a contact type or a non-contact type. For example, when a bar code is employed by the identification indicating part 4 to represent identification information, optical reading means may be employed as the first reader 8. On the other hand, if a memory circuit is employed as the identification information storage 5, then the second reader 9 may be a set of contact terminals via which information is read from the memory circuit.

The identification information read by the first reader 8 or the identification information read by the second reader 9 is employed as the identification information of the recording medium 3 by an identification information decision unit 10. For example, if the identification information cannot be read by the first reader 8, then information read from the identification information storage 5 by the second reader 9 is employed as the identification information of the recording medium 3.

Preferably, the reading of the identification information by the first reader 8 or the second reader 9 is performed before the recording/reproducing means 7 starts to record or reproduce information from the recording medium 3 disposed inside the recording medium cartridge 1, because the identification information can be read easier and more rapidly than information can be recorded or reproduced on or from the recording medium and thus the management of the identification information would be inefficient if the identification information were read after completing a long recording or reproducing process.

Figure 2:
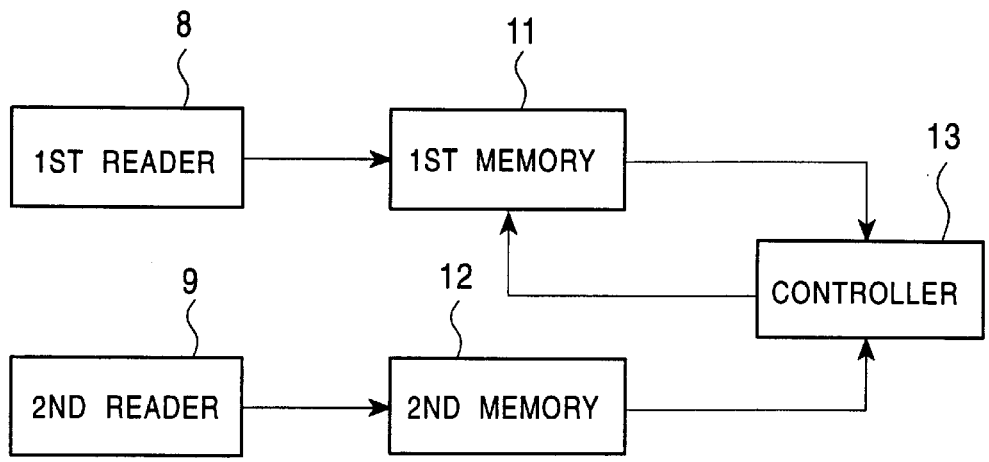
FIG. 2 is a block diagram illustrating the operation of reading and storing identification information.

Preferably, as shown in FIG. 2, the identification information decision unit 10 includes a first memory for storing identification information read via the first reader 8, a second memory for storing identification information read via the second reader 9, and a memory controller 13 by which, when the first reader 8 cannot read identification information from the identification indicating part 4, information identical to the identification information read from the identification information storage 5 and stored in the second memory 12 is stored in the first memory 11. When the identification information of the identification indicating part 4 becomes unreadable, if the identification information stored in the identification information storage 5 is readable, this identification information which is identical to the identification information of the identification indicating part 4 is stored in the first memory 11. Thus, the identification information of the identification indicating part 4 which is expected to be stored in the first memory 11 is recovered by the identification information stored in the identification information storage 5.

The first memory 11 and the second memory 12 may be provided separately, or they may be formed in single storage means in such a manner that a half of the storage area of the single storage means is used as the first memory 11 and the other half storage area is used as the second memory 12. In the latter case, information stored in the first memory 11 may be related to the information stored in the second memory 12.

The operation of reading identification information is not always successful. Besides, even when the identification information is readable, there is a possibility that the identification information read from the identification indicating part 4 is not identical to the identification information read from the identification information storage 5. For example, if the identification information of the identification indicating part 4 is degraded after frequent usage of the recording medium cartridge, an error can occur in the operation of reading the identification information from the identification indicating part 4. This can cause inconsistency between the information read from the identification indicating part 4 and that read from the identification information storage 5.

Figure 3:
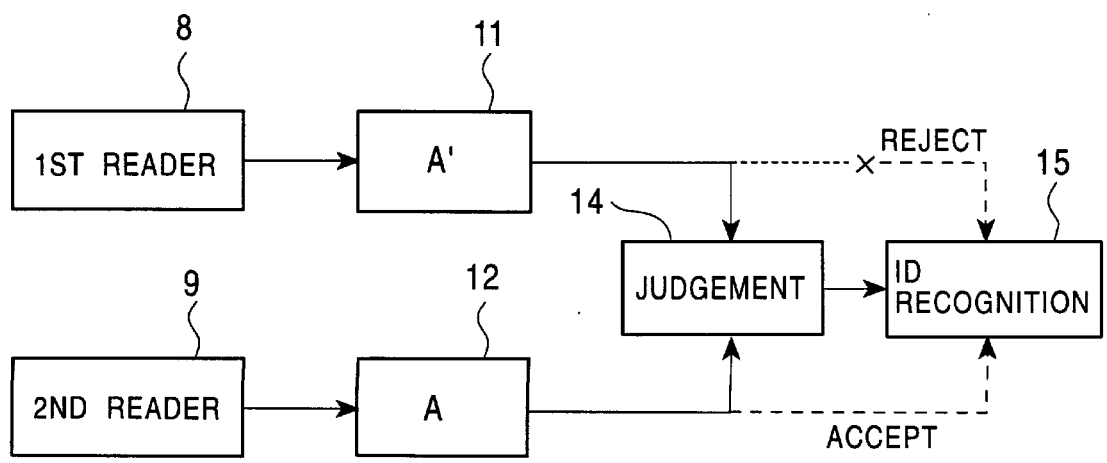
FIG. 3 is a block diagram illustrating the operation of detecting inconsistency in the identification information and dealing with it.

To overcome the above problem, it is desirable, as shown in FIG. 3, to provide a judgment unit 14 for judging whether identification information A read from the identification indicating part 4 and stored in the first memory 11 is identical to identification information A read from the identification information storage 5 and stored in the second memory 12 by comparing these two pieces of information with each other. If the judgment unit 14 detects inconsistency between the two pieces of information, the identification information A obtained via the second reader 9 is employed by an identification information decision unit 15 as correct identification information associated with the recording means 3, because the information stored in the identification information storage 5 can be maintained in a more reliable fashion for a longer time than the identification information of the identification indicating part 4. When inconsistency between the two pieces of information is detected, reading operation may be performed repeatedly. However, if the degradation of the identification indicating part 4 is rather great, it is not expected that the repetition of reading operation will finally result in consistency between the two pieces of information. Furthermore, the increase in the number of reading operations will result in further degradation of the identification indicating part 4. In conclusion, it is more preferable to simply employ the highly reliable identification information stored in the identification information storage 5, because reliable information can be obtained in a short time.

Now, an information management system for managing a great amount of information using recording medium cartridges 1 will be described above.

Figure 4:
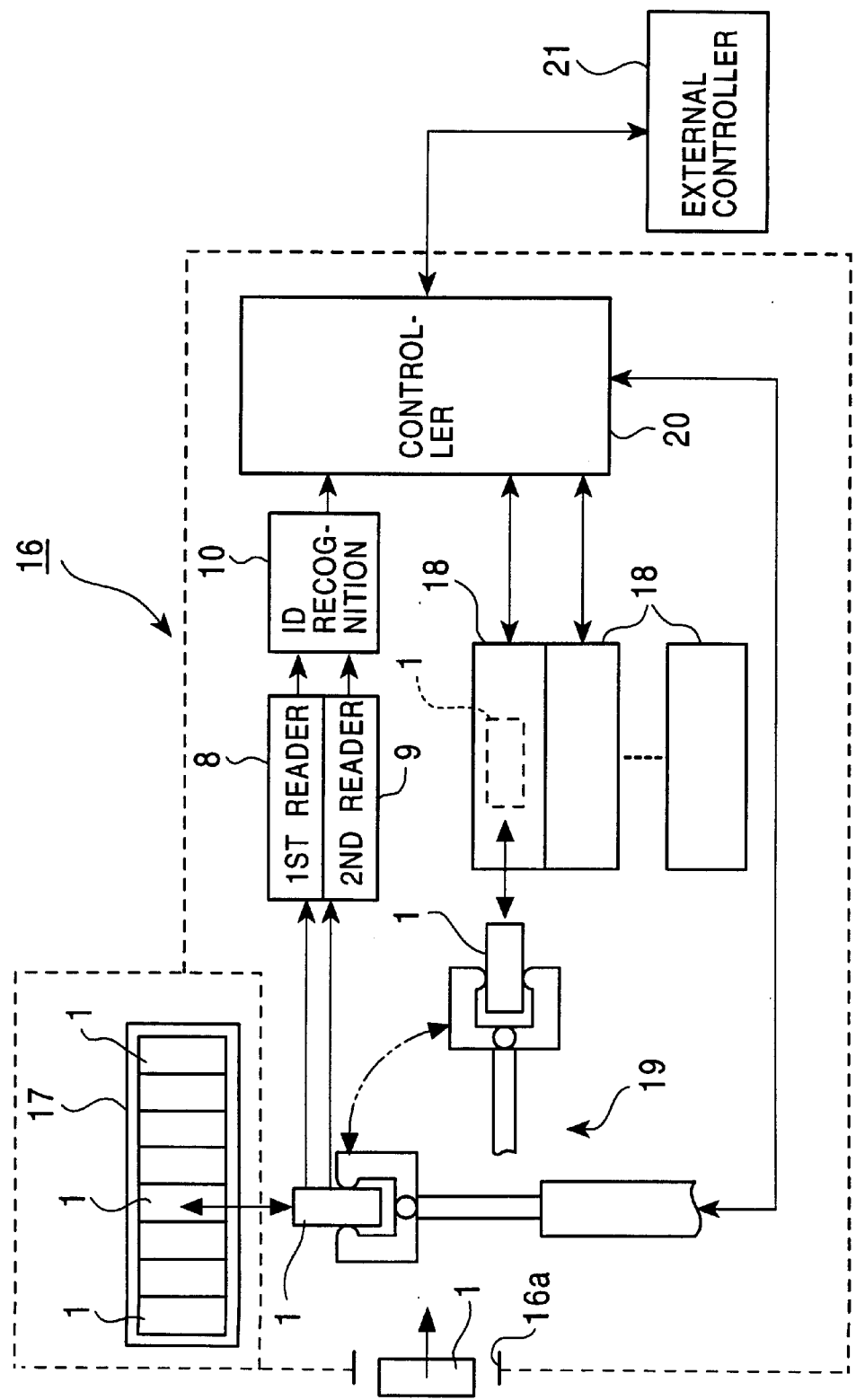
FIG. 4 is a block diagram illustrating the structure of an information management system according to the present invention.
Figure 5:
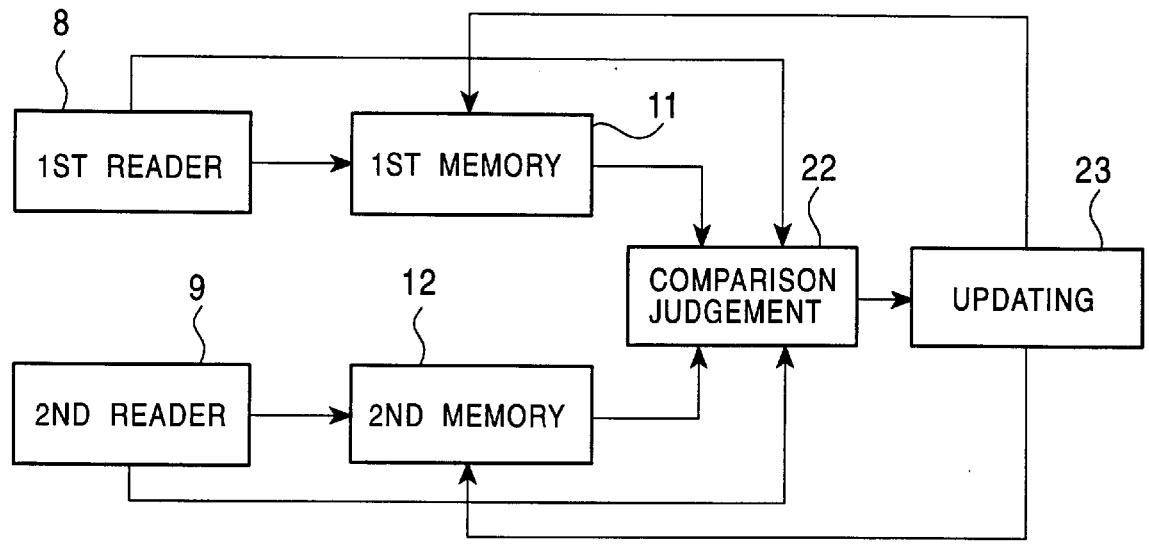
FIG. 5 is a block diagram illustrating the operation of verifying the identification information and updating it.

FIG. 4 illustrates the construction of the information management system 16, which includes: a cartridge storage rack 17 for storing a plurality of recording medium cartridges 1, 1 . . . ; recording/reproducing units 18, 18, . . . for recording or reproducing information on or from the recording medium 3 of a selected recording medium cartridge; and a transfer mechanism 19 for taking a desired recording medium cartridge out of the cartridge storage rack 17 and carrying it to a proper recording/reproducing unit 18. The information management system 16 further includes: a first reader 8 for reading the identification information of the identification indicating part 4 of each recording medium cartridge 1; a second reader 9 for reading the identification information from the identification information storage 5 of each recording medium cartridge 1; and an identification information decision unit 10 for employing either the identification information read via the first reader 8 or the identification information read via the second reader 9 as the identification information associated with a particular recording medium 3. When the first reader 8 cannot read the identification information of the identification indicating part 4, the identification information decision unit 10 employs the identification information read via the second reader 9 as the identification information associated with the recording medium 3.

The information management system 16 also includes a controller 20 for controlling various parts of the system. The controller 20 controls the operation of the recording/reproducing units 18, 18, . . . and the transfer mechanism 19. The controller 20 also manages the identification information with recording media 3 in accordance with signals received from the identification information decision unit 10.

The controller 20 also serves as an information center. That is, in response to a command from an external control device 21 such as a host computer, the controller 20 reproduces requested information from the recording medium 3 of a particular recording medium cartridge 1 and transmits it to the external control device 21. Furthermore, in response to a command from the external control device 21, the controller 20 also records information on the recording medium of a particular recording medium cartridge.

When a recording medium cartridge whose identification information has not been registered yet is to be placed in the cartridge storage rack 17, the recording medium cartridge 1 is first inserted into the system 16 via an insertion slot 16a, the identification information of the identification indicating part 4 and the identification information stored in the identification information storage 5 of the recording medium cartridge are read by the first reader 8 and the second reader 9, respectively, before starting to reproduce or recording information from or on the recording medium 3 of that recording medium cartridge 1. The reason why the reading of identification information is performed first is that identification information can be read in a short time and that the management of identification information can be performed in an efficient and easy fashion.

After the electric power of the information management system 16 is turned on, it is desirable to read the identification information (the identification information of the identification indicating part 4 and the identification information stored in the identification information storage 5) of each recording medium cartridge 1 stored in the cartridge storage rack 17 and store the obtained information into proper storage means so as to avoid the following problems. When the system 16 is constructed in such a manner that a human operator can take a recording medium cartridge from the cartridge storage rack 17 or replace a recording medium cartridge in the cartridge storage rack 17 with another cartridge as is the case with the rack placed outside the main part of the system 16 or as is the case with the system in which a human operator can enter, there is a possibility that the identification information of a recording medium cartridge placed in a particular location of the rack becomes different from the identification information which is stored in the storage means as identification information associated with the recording medium cartridge in that particular location. Furthermore, if the electric power of the information management system 16 is turned on after a long unused time, there is a possibility that the identification indicating part 4 of a recording medium cartridge 1 has been degraded to such an extent that the identification information is difficult to read.

To avoid the above problem, the information management system 6 may be constructed in such a manner as to include a first memory 11 for storing identification information of the identification indicating part 4 of each recording medium cartridge 1 read by a first reader 8; a second memory 12 for storing identification information of the identification information storage 5 of each recording medium cartridge 1 read by a second reader 9; and a comparison judgment unit 22 by which, when the identification information of the identification indicating part 4 and the identification information stored in the identification information storage 5 are, after the electric power of the system 6 is turned on, read by the first reader 8 and the second reader 9, respectively, for each recording medium cartridge 1 stored in a cartridge storage rack 17, the two pieces of information ready by the first and second readers are compared with the identification information already stored in the first and second memories 11 and 12, respectively, so as to determine whether information is consistent or not. The information management system 6 further includes an updating unit 23 by which, if the comparison judgment unit 22 detects inconsistency in identification information, the contents of the first memory 11 and the second memory 12 are updated by the identification information read by the first and second readers 8 and 9. That is, when the identification information read by the readers 8 and 9 is identical to the information stored in the memories 11 and 12, the contents of the memories 11 and 12 are maintained unchanged. However, the contents of the memories 11 and 12 are replaced by the identification information read by the readers 8 and 9 if the identification information read by the readers 8 and 9 is not identical to the information stored in the memories 11 and 12.

Referring now to FIGS. 6–15, a tape cassette and a tape library system for managing information using tape cassettes according to an embodiment of the invention are described below.

Figure 6:
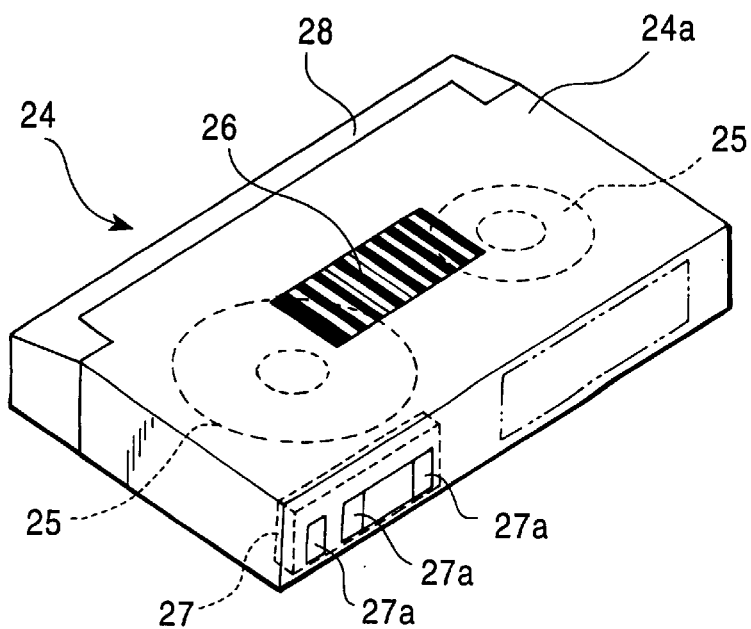

FIG. 6 illustrates the construction of the tape cassette 24. A magnetic tape 25 serving as a recording medium is disposed in a case 24a in such a manner that the magnetic tape 25 is wound around reels not shown in FIG. 6.

A bar code label 26 corresponding to the identification indicating part 4 is provided on the case 24a of the tape cassette 24. Inside the case 24a, there is provided a memory integrated circuit (hereinafter referred to as an MIC) 27 corresponding to the identification information storage 5. Contact terminals 27a, 27a, . . . used to transfer information from the MIC 27 are provided in such a manner that they are exposed to the outside of the case 24a. Although the bar code label 26 is on the upper surface of the tape cassette 24, the location where the bar code label 26 is put on is not limited to the upper surface but it may be put on another surface such as the lower surface, the back surface, or either side surface (herein the side where a door plate 28 is located is defined as the front side) of the tape cassette 24, at a proper location (for example as shown by the two-dot chain line in FIG. 6). Furthermore, the MIC 27 may also be disposed at any properly selected location in the case 24a. Furthermore, a slidable shutter or cover may also be provided to protect the contact terminals 27a, 27a, . . . of the MIC 27 so that the contact terminals 27a, 27a, . . . are exposed to the outside only when information is read from the MIC 27.

Figure 7:
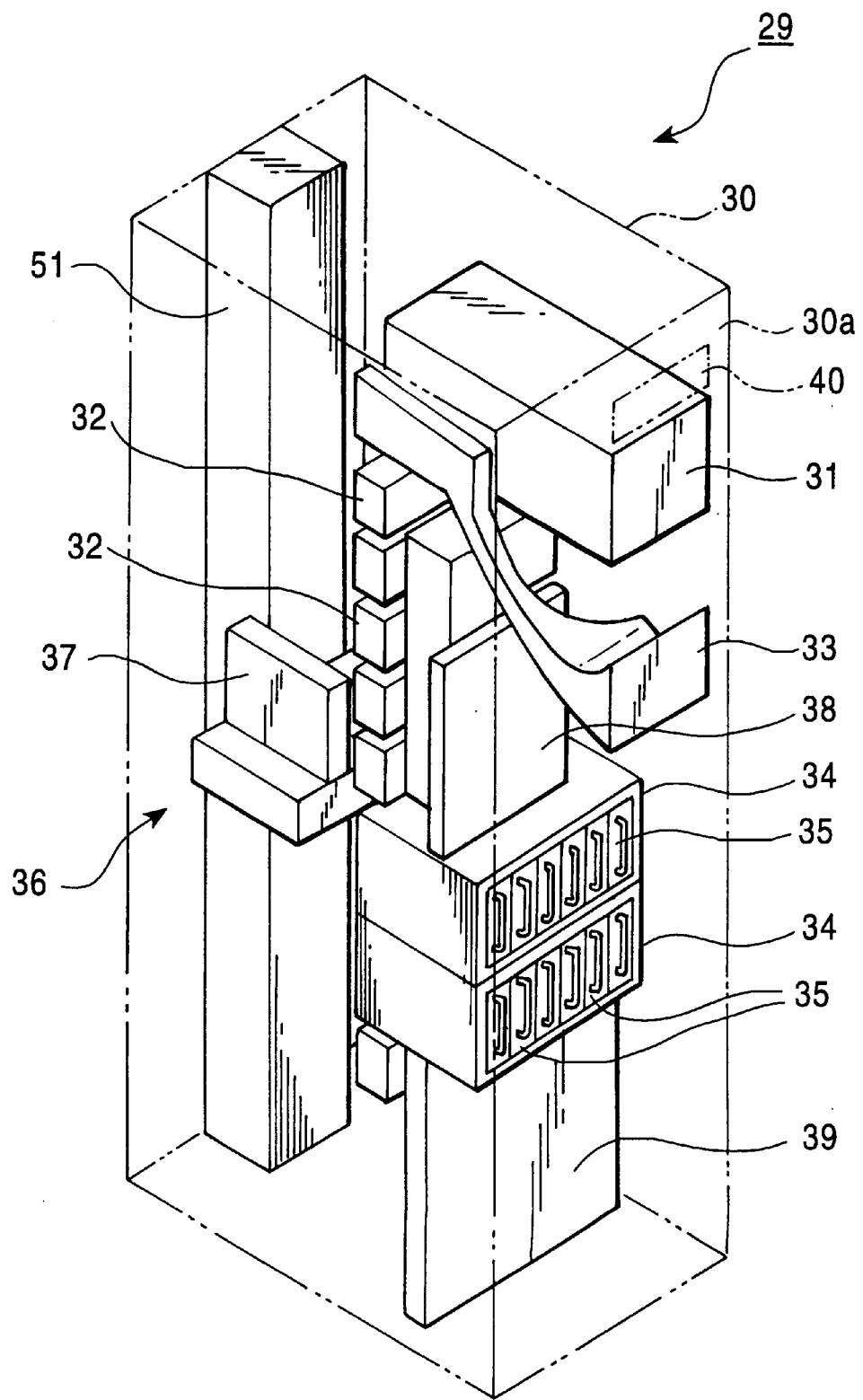
FIG. 7 is a perspective view illustrating a tape library system.

FIG. 7 generally illustrates the construction of a tape library system 29. Tape cassettes (not shown) are placed, via a cassette supplying part 31 provided in the front panel 30a of the case 30, into a cassette storage rack 32, 32, . . . disposed along a vertical direction from the middle part in the case 30 toward both the upper and bottom locations in the case 30. There is an ejection part 33 at a location slightly lower than the tape cassette supplying part 31 so that a tape cassette can be taken outside via a proper chute.

In drive cases 34, 34, . . . disposed below the cassette storage racks 32, 32, . . . , there are a plurality of tape drive units 35, 35, . . . , arranged side by side, corresponding to the recording/reproducing means 18, 18, . . .

A transfer mechanism 36 is disposed at a location opposite to the cassette storage racks 32 and the drive cases 34 so that a desired tape cassette is taken from a particular cassette storage rack 32 and transferred to a desired tape drive unit 35 by the transfer mechanism 36. The transfer mechanism 36 is also used to return the tape cassette to the original location in the rack 32. The transfer mechanism 36 may be realized for example by a 3-dimensional orthogonal robot. The transfer mechanism 36 includes a hand block 37, and a moving mechanism for moving a cassette along a vertical shaft or a horizontal shaft.

A mechanical control unit 38 for controlling the operation of the transfer mechanism 36 is disposed above the drive cases 34. Below the drive cases 34, there is provided a system controller 39 which is a central control device of the tape library system 29.

A liquid crystal display 40 is provided on the front panel 30a, at a location slightly higher than the cassette supplying part 31.

Figure 8:
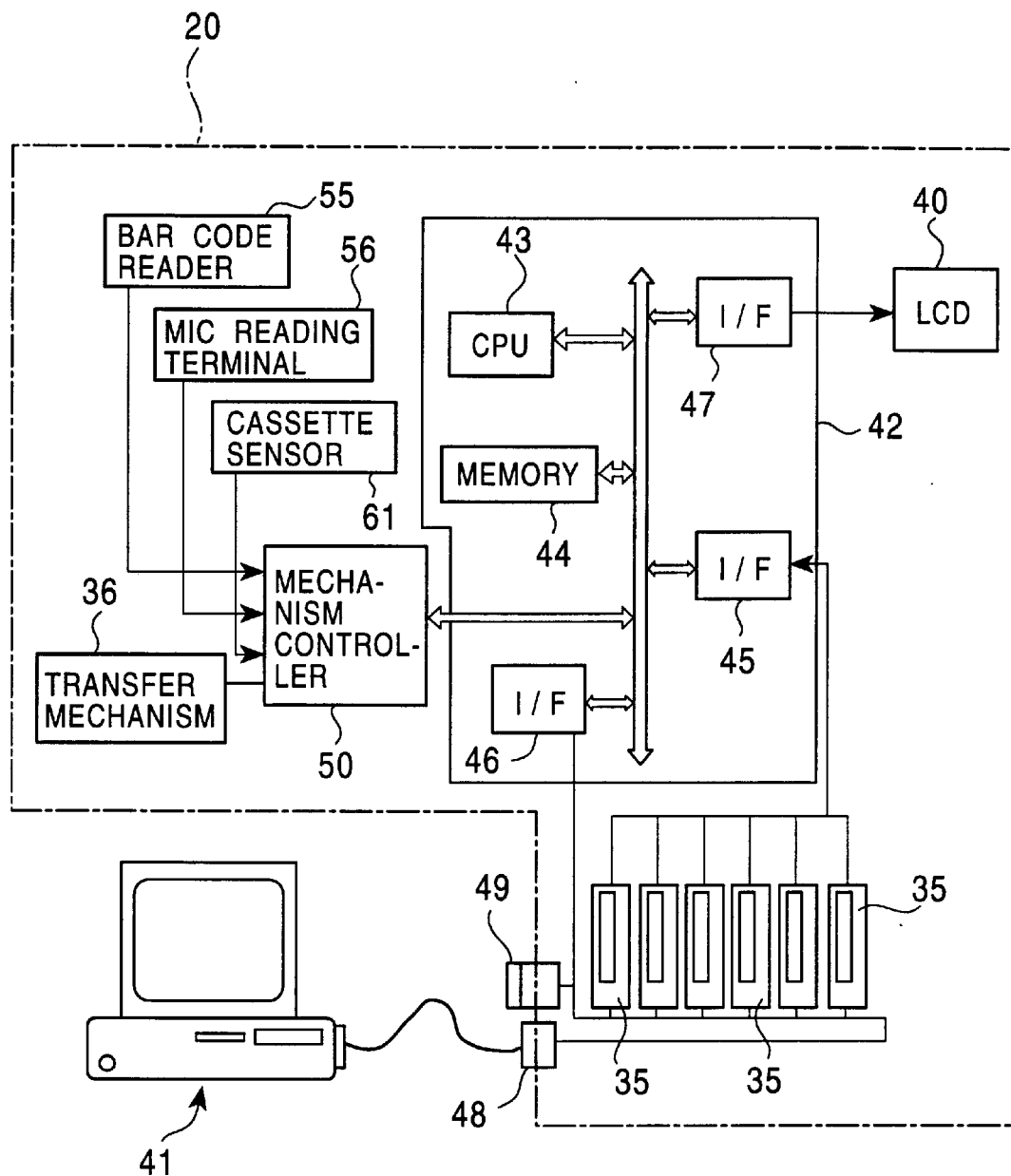
FIG. 8 is a bock diagram illustrating the main internal elements of the tape library system as well as a host computer.

FIG. 8 illustrates the main elements of the tape library system 29 as well as a host computer 41. A SCSI (small computer system interface) ID is assigned to the tape drive units 35, 35, . . . , and another SCSI ID is assigned to the library controller 42 forming the control unit 20.

The library controller 42 (in the system controller 39) in the tape library system 29 includes a CPU (central processing unit) 43, a memory 44 such as a RAM (random access memory) or a ROM (read-only memory), and interfaces 45, 46, and 47.

The plurality of tape drive units 35, 35, . . . are connected in a daisy chain fashion. The tape library system 20 also includes a SCSI interface 48 via which the tape drive units 35, 35, . . . are connected to the host computer 41. The SCSI daisy chain connection is terminated with a terminator (terminating resistor) 49. That is, information is transmitted among the tape drive units 35, the host computer 41, and the library controller 42, via the SCSI interfaces 46, and 48. The interface 45 is used by the library controller 42 to communicate with the tape drive units 35 to check whether there is a tape cassette in the tape drive units 35.

The mechanism controller 50 (in the mechanical control unit 38) is responsible mainly for controlling the transfer mechanism 36 while communicating with the library controller 42.

Figure 9:
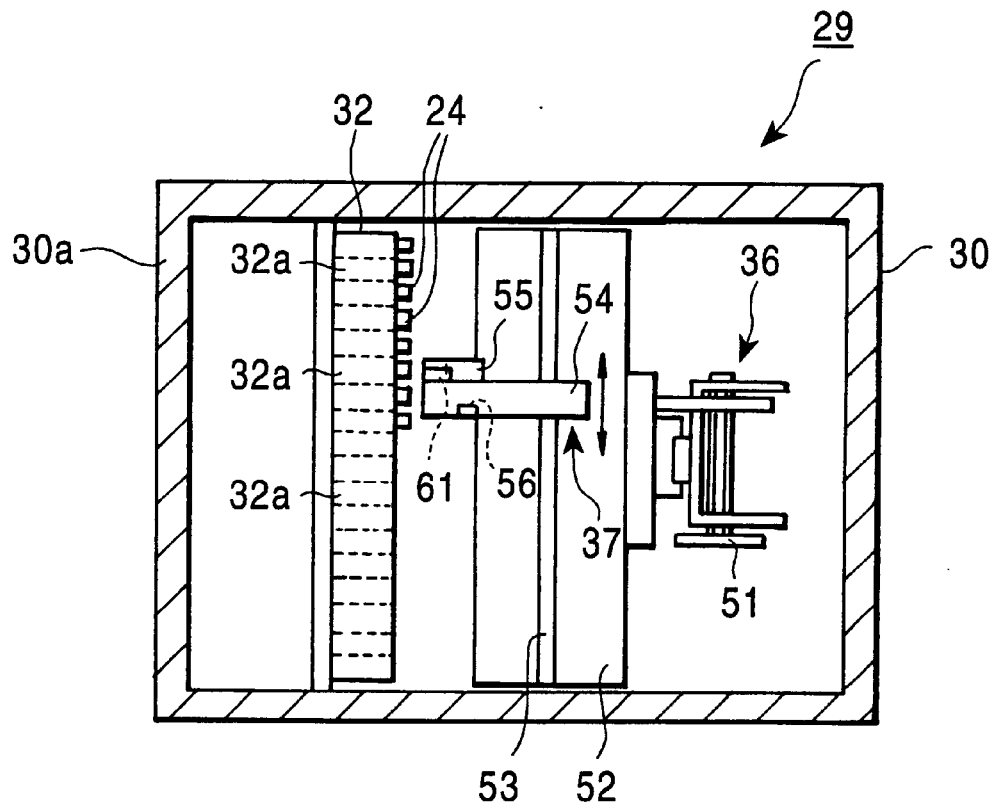
FIG. 9 is a cross-sectional view of the tape library system, taken along a horizontal plane near the cassette storage rack.

FIG. 9 is a cross-sectional view of the tape library system 29, taken along a horizontal plane near the cassette storage racks 32. As shown in FIG. 9, the transfer mechanism 36 includes: a supporting shaft 51 extending (vertically) in a direction perpendicular to the drawing sheet of FIG. 9; a movable table 52 which can be moved in the vertical direction along the supporting shaft 51; and a hand block 37 slidable along a guide rail 53 provided on the movable table 52 in a horizontal direction parallel to the storage plane of the cassette storage racks 32.

Each cassettes storage rack 32 has a plurality of chambers 32a, 32a, . . . in which tape cassettes 24, 24, . . . are placed.

A bar code label 26 is stuck to each tape cassette 24, at a location which is outside the cassette storage rack 32 when the tape cassette 24 is put into the rack 32. Near this location, contact terminals 27a, 27a, . . . of the MIC 27 are exposed to the outside.

The hand block 37 includes a bar code reader 55 (corresponding to the first reader 8) for reading the bar code information of each tape cassette 24, and also includes a set of MIC terminals 56 (corresponding to the second reader 9) for reading information from the MIC 27. The bar code information and the information stored in the MIC 27 are transmitted to the library controller 42 via the mechanism controller 50. The identification information decision unit and the identification information storage controller are realized by means of software in conjunction with the mechanism controller 50 and the library controller 42.

The reason why the hand block 37 has the bar code reader 55 and the MIC contact terminals 56 is to make it possible to quickly read the identification information of a tape cassette 24 on the way from the cassette storage rack 32 to a specified tape drive unit 35 or on the way from the cassette supplying part 31 to the cassette storage rack 32. If the bar code reader or the MIC contact terminals were disposed on or near the tape drive units 35, it would take a long time to transfer a tape cassette 24 from the cassette storage rack 32 or the cassette supplying part 31 to the bar code reader or the MIC contact terminals.

Transmission of information from the library controller 42 to the liquid crystal display 40 is performed via the interface 47.

Figure 10:
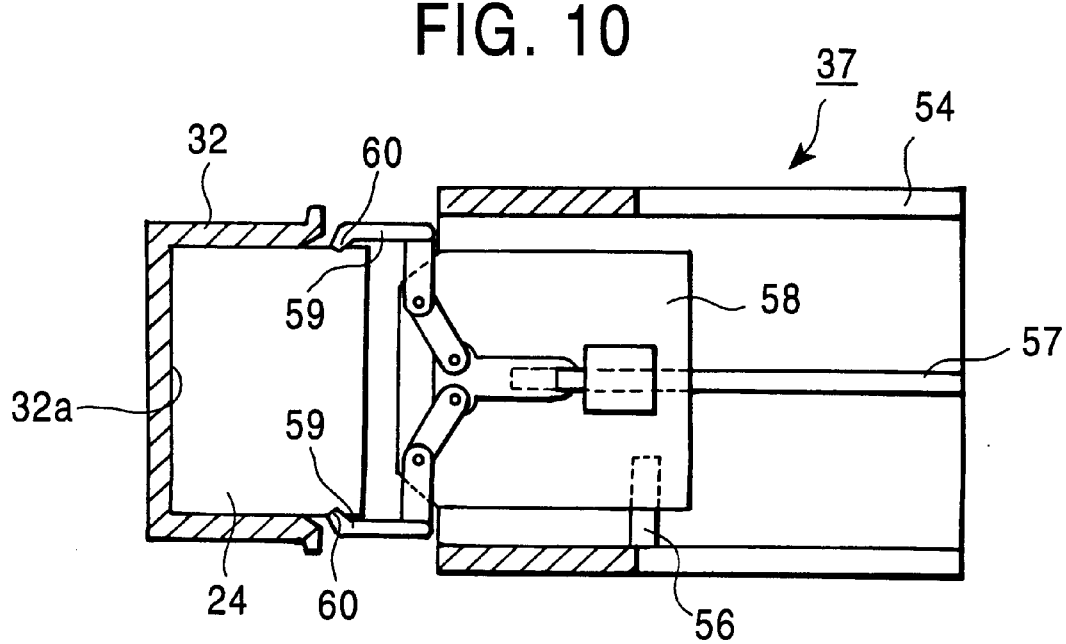
Figure 11:
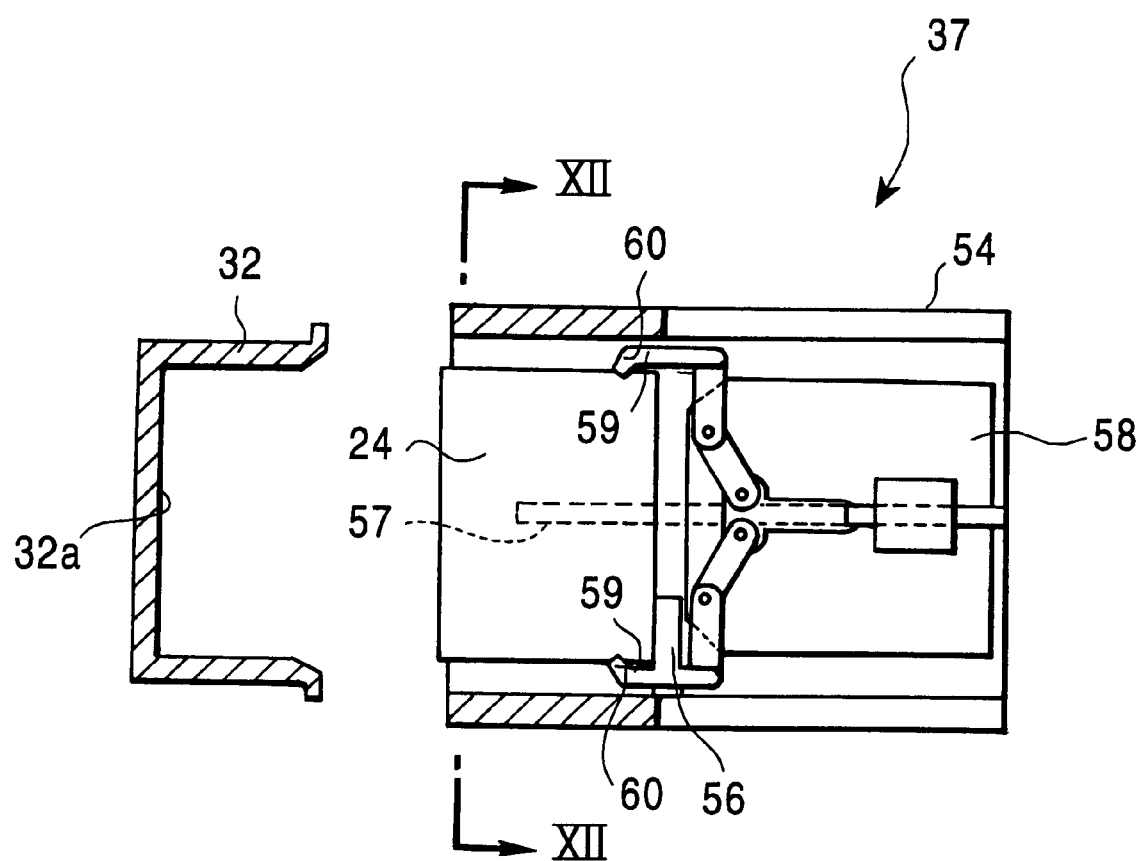
FIG. 11 illustrates the tape cassette which has been drawn into the hand block.
Figure 12:
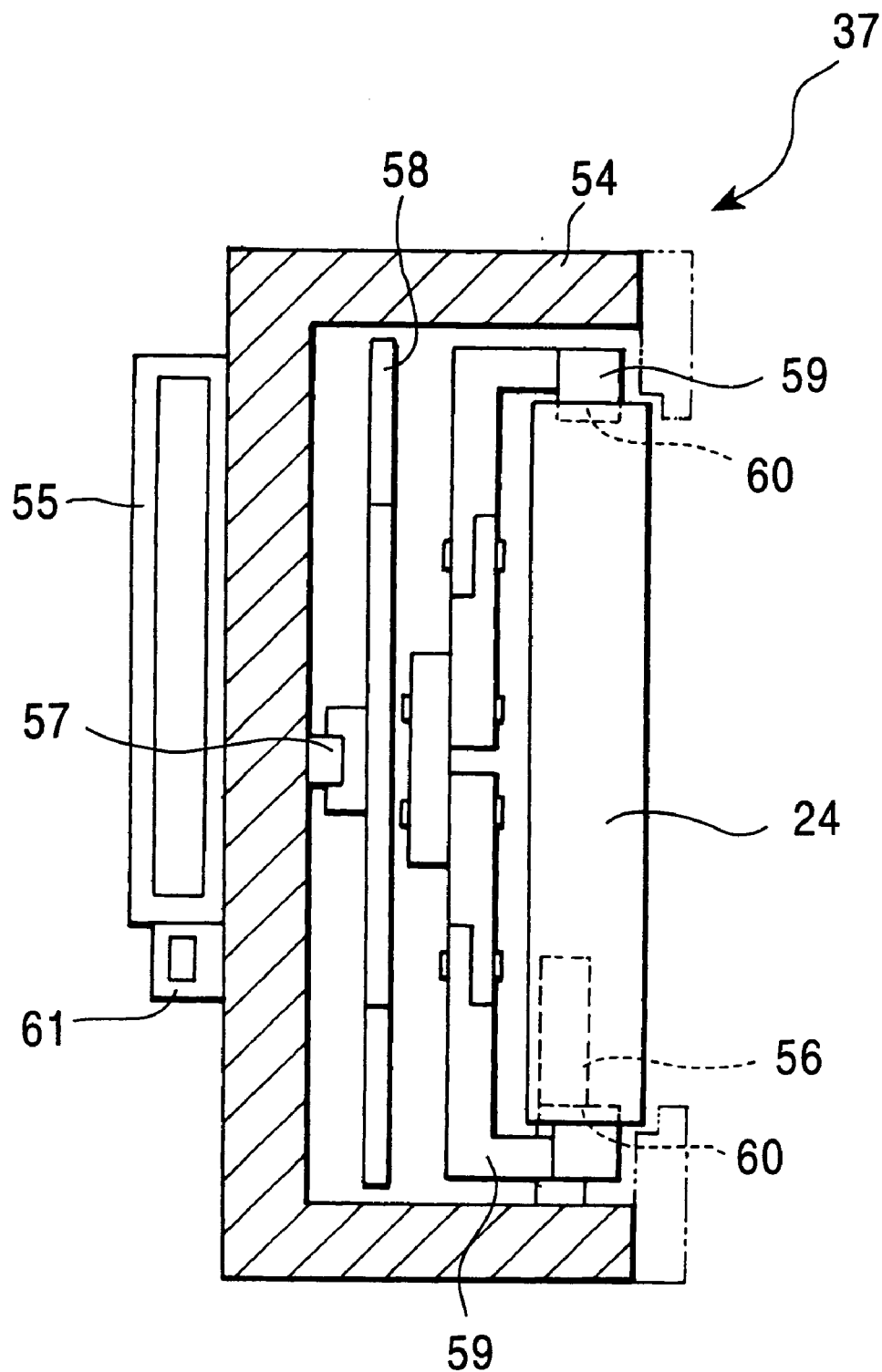
FIG. 12 is an enlarged cross-sectional view of the hand block, taken along line XII—XII of FIG. 11.

FIGS. 10–12 illustrate the mechanism for reading the identification information of a tape cassette.

FIGS. 10 and 11 illustrate a longitudinal cross section of the cassette storage rack 32 and the hand block 37, In FIG. 10, there is shown a tape cassette 24 in the cassette storage rack 32, which is to be taken out from the cassette storage rack 32 by the hand chuck 59 of the hand block 37.

The hand block 37 has a hand base 58 which is moved by a means (not shown) in a horizontal direction along a guide rail 57 disposed on case 54. The hand chuck 59 of the hand block 37 is used to hold the tape cassette 24 by fitting end portions of the hand chuck 59 into recesses 60, 60 formed on the side walls of the tape cassette 24. The position of the hand chuck 59 is controlled by a mechanism (not shown) so that the tape cassette 24 is held firmly.

In FIG. 11, there is shown a tape cassette 24 which is drawn into the hand block 37.

A set of MIC contact terminals 56 is disposed on the case 54 of the hand block 37, at a location corresponding to the contact terminals of the MIC 27 of the tape cassette 24 at the drawn position (in this specific embodiment, the contact terminals 27a, 27a, . . . are exposed to the outside via the back surface of the tape cassette 24) so that the set of MIC contact terminals comes into contact with the contact terminals 27a, 27a, . . . of the MIC 27, so as to make it possible to read the identification information stored in the MIC 27.

FIG. 12 is an enlarged cross-sectional view of the hand block 37, taken along line XII—XII of FIG. 11. As shown in FIG. 12, a bar code reader 55 is disposed on the side wall of the case 54. There is provided a cassette sensor 61 directly below the bar code reader 55. The cassette sensor 61 is used to determine whether there is a cassette tape 24. In the present embodiment, the bar code label 26 is stuck to the back side of each tape cassette, and the hand block 37 is moved by the transfer mechanism 36 so that the bar code reader 55 comes to a location corresponding to the bar code label 26. After the hand block 37 comes to the correct position, information is read from the bar code label 26. The cassette sensor 61 is realized by a non-contact type sensor such as an optical sensor (for example a reflection type sensor) or a contact type sensor (for example, a sensing switch).

To read the identification information of a tape cassette located in the cassette supplying part 31, a similar mechanism provided on the cassette storage rack 32 shown in FIGS. 10–12 may be provided on the cassette supplying part 31, and the information may be read in a similar manner.

Figure 13:
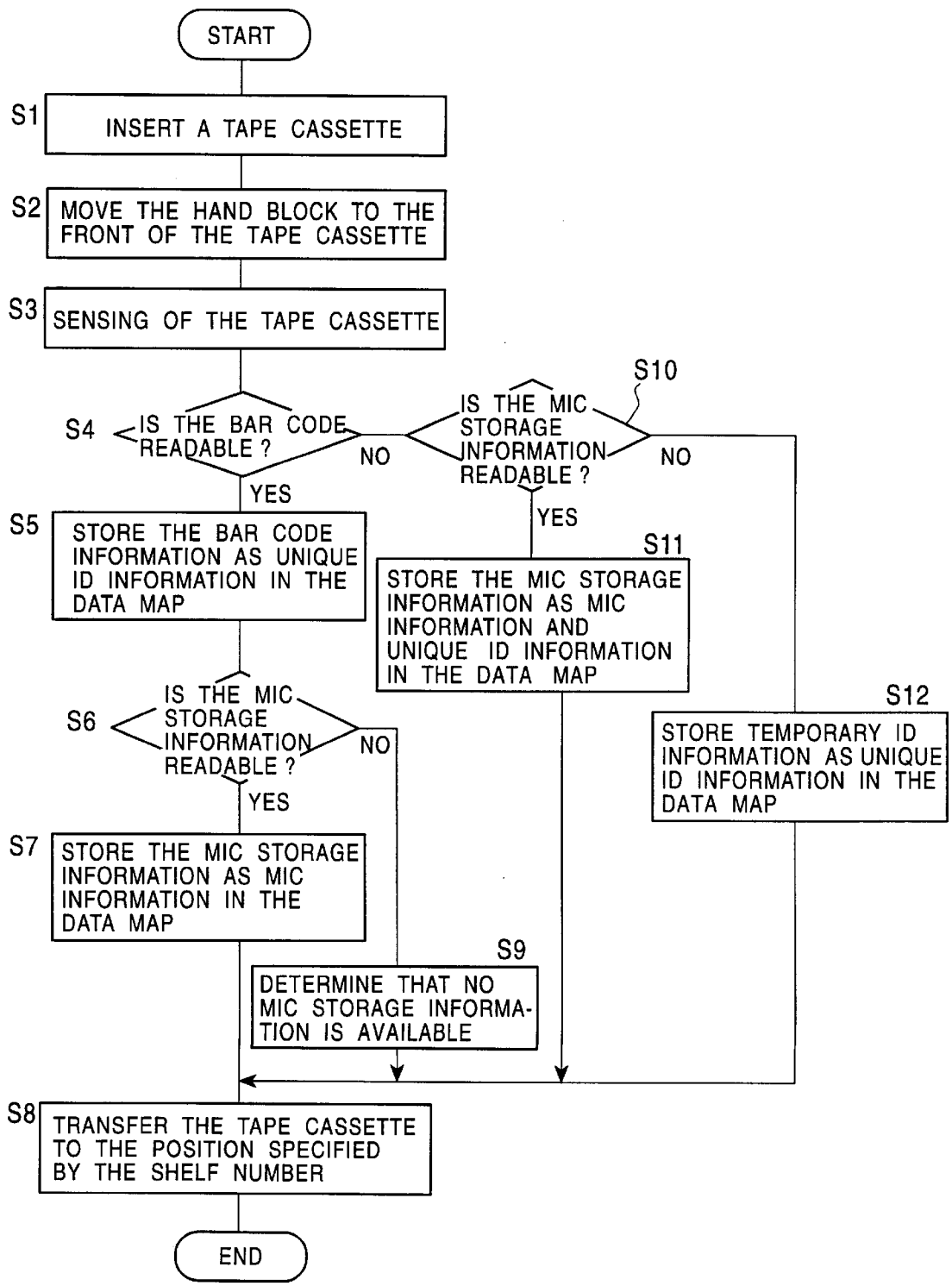
FIG. 13 is a flow chart illustrating the operation of detecting and storing identification information when a tape cassette whose identification information has not been identified yet is placed into the tape library system.

FIG. 13 is a flow chart illustrating the operation of detecting and storing bar code information and information stored in the MIC 27 when a tape cassette whose identification information has not been identified yet is placed into the tape library system 29. This process is performed by the mechanism controller 50 and the library controller 41 as described below. At the first step S1, a new tape cassette is inserted into the cassette supplying part 31 of the tape cassette library system 29. Then in step S2, the transfer mechanism 36 moves its hand block 36 to the front of the tape cassette.

In step S3, if the cassette sensor 61 of the hand block 37 detects the presence of the tape cassette whose identification information is to be read, then in step 54, the bar code information of the tape cassette is read by the bar code reader 55. If the bar code information was read successfully in steps S4, then the process goes to step S5. In the opposite case (which can occur when the bar code label 26 has been degraded in such a degree that information can not be read, or there is no bar code label 26 on the tape cassette, or otherwise information is not read due to an inadequate manner in which the bar code label 26 is put on the tape cassette), the process goes to step S10.

In step S5, the bar code information read in step S4 is registered in a particular data map in the memory 44. The data map is constructed in the first and second memories described above. It is preferable to employ a non-volatile memory as the first and second memories. If a volatile memory is used, data may be stored as a file on a a hard disk. Table 1 illustrates a specific example of the data map.

TABLE 1

DATA MAP

| COLUMN NUMBER | 1 | 2 | 3 | 4 | 5 | — | — | — | — | n − 1 | n |
|---|---|---|---|---|---|---|---|---|---|---|---|
| UNIQUE ID INFORMATION | 0 | 0 | 0 | | | | | | | | |
| | 0 | 0 | 0 | | | | | | | | |
| | 0 | 0 | 0 | | | | | | | | |
| | 0 | 0 | 0 | | | | | | | | |
| | 0 | 0 | 0 | A | — | — | — | | | | |
| | 0 | 0 | 0 | | | | | | | | |
| | 0 | 1 | 1 | | | | | | | | |
| | 1 | 0 | 1 | | | | | | | | |
| | 1 | 0 | 2 | | | | | | | | |
| MIC INFORMATION | 0 | 0 | 0 | 0 | | | | | | | |
| | 0 | 0 | 0 | 0 | | | | | | | |
| | 0 | 0 | 0 | 0 | | | | | | | |
| | 0 | 0 | 0 | 0 | | | | | | | |
| | 0 | 0 | 0 | 0 | — | — | — | | | | |
| | 0 | 0 | 0 | 1 | | | | | | | |
| | 0 | 1 | 1 | 1 | | | | | | | |
| | 1 | 0 | 1 | 3 | | | | | | | |
| | 1 | 0 | 2 | 4 | | | | | | | |

In Table 1, the shelf number refers to a number uniquely assigned to each small chamber 32a formed in the cassette storage rack 32 to store a tape cassette, so that the location where each tape cassette is stored can be known by the shelf number assigned to it.

The "unique identification information" includes the following information:

(1) bar code information;
(2) MIC storage information; and
(3) temporary identification information.

The "bar code information" refers to identification information which is read from the bar code when the bar code of tape cassettes is readable.

The "MIC storage information" refers to identification information which is read from the MIC 27 when the bar code is unreadable and the information stored in the MIC is readable.

The "temporary identification information" refers to identification information which is temporarily given to a tape cassette when the bar code information and the information stored in the MIC 27 are both unreadable. In the case where there is a plurality of such tape cassettes, temporary identification information is given to each tape cassette in such a manner that the temporary identification information uniquely indicates each of these tape cassettes and in such a manner that there is no overlap in identification information not only among the above tape cassettes but among all tape cassettes including existing ones whose identification information is already known.

The term "MIC information" is used to represent information which is the identification information of the MIC 27 when it can be readable but which is information indicating that the identification information of the MIC is not available or default information (predefined default information) in the case where the identification information of the MIC is unreadable due to a failure of the MIC or due to the lack of MIC.

In the specific example of Table 1, those tape cassettes stored at locations having shelf numbers 1 to 3 of the cassette storage rack 32 are readable for both bar code information and identification information stored in the MIC 27. Furthermore, it is assumed herein that these two pieces of detected information are identical to each other. On the other hand, the bar code information of a tape cassette stored at location with a shelf number 4 is unreadable, although its identification information stored in the MIC is readable.

Referring again to FIG. 13, when the bar code information of the tape cassette was read successfully, the process goes to step S5 as described above, and the detected bar code information is stored in the memory at a storage location corresponding to the unique identification information field shown in Table 1, at an address equal to the shelf number indicated in the unique identification information column of Table 1.

In the next step S6, the tape cassette to be identified is held by the hand chuck 59 of the hand block 37 and drawn into the hand block 37 (FIG. 11). The terminals 27a, 27a, . . . of the MIC 27 are connected to the MIC contact terminals 56, and the information stored in the MIC 27 is read. If the MIC storage information was read successfully, then the process goes to step S7. However the process goes to step S9 if the MIC storage information was not read successfully.

In step S7, the information read from the MIC 27 is stored in the memory at a storage location corresponding to the MIC information field shown in Table 1, at an address equal to the shelf number indicating the location where the tape cassette is stored. Then the process goes to step S8, and the tape cassette is transferred to a specified storage location.

On the other hand, in step S9, the information indicating that the identification information is not detected from the MIC 27 is stored in the memory at a storage location corresponding to the MIC information field shown in Table 1, at an address equal to the shelf number indicating where the tape cassette is stored, and then the process goes to step S8. In step S8, the tape cassette is transferred to a specified storage location.

In step S10, the information stored in the MIC is read in a similar manner to step S6. If the MIC storage information was read successfully, then the process goes to step S11. However, the process goes to step S12 if the MIC storage information was not read successfully.

Thus, the process goes to S11 when the information stored in the MIC 27 was read successfully, although the detection of the bar code information was failed. In this case, in step 11, the information read from the MIC 27 is stored in the memory at a storage location corresponding to the MIC information field shown in Table 1, at an address equal to the shelf number indication where the tape cassette is stored, and the MIC storage information is copied into the unique identification information field at the same address (refer to (2) MIC storage information). For example, the MIC information is copied into the unique identification information field denoted by "A" in the column having a shelf number of 4 in Table 1. Then in step S8, the tape cassette is transferred to a specified storage location.

If the bar code information and the information stored in the MIC 27 are both unreadable, the process eventually arrives at step S12. In this case, as described in (3) "temporary identification information", temporary identification number is stored in the unique identification information field, and information indicating that no identification information is detected from the MIC is stored in the MIC information field. Then the process goes to step S8 to transfer the tape cassette to a specified storage location.

If the unique identification information and the MIC information are not identical to each other, the MIC information is preferably selected as correct information, as described above. To determine whether the unique identification information and the MIC information are identical to each other, an additional step may be interposed between steps S6 and S7 in FIG. 13. If it is determined in this additional step that these two pieces of information are identical to each other, then the process goes to step S7. If they are not identical to each other, the information which has been read from the MIC 27 in step S6 is stored in the MIC information field, and then the same information is also stored in the unique identification information field.

If the above process is completed for all unregistered tape cassettes, a complete tape map such as that shown in Table 1 is obtained, and it becomes possible to build a tape cassette management database according to this tape map.

Figure 14:
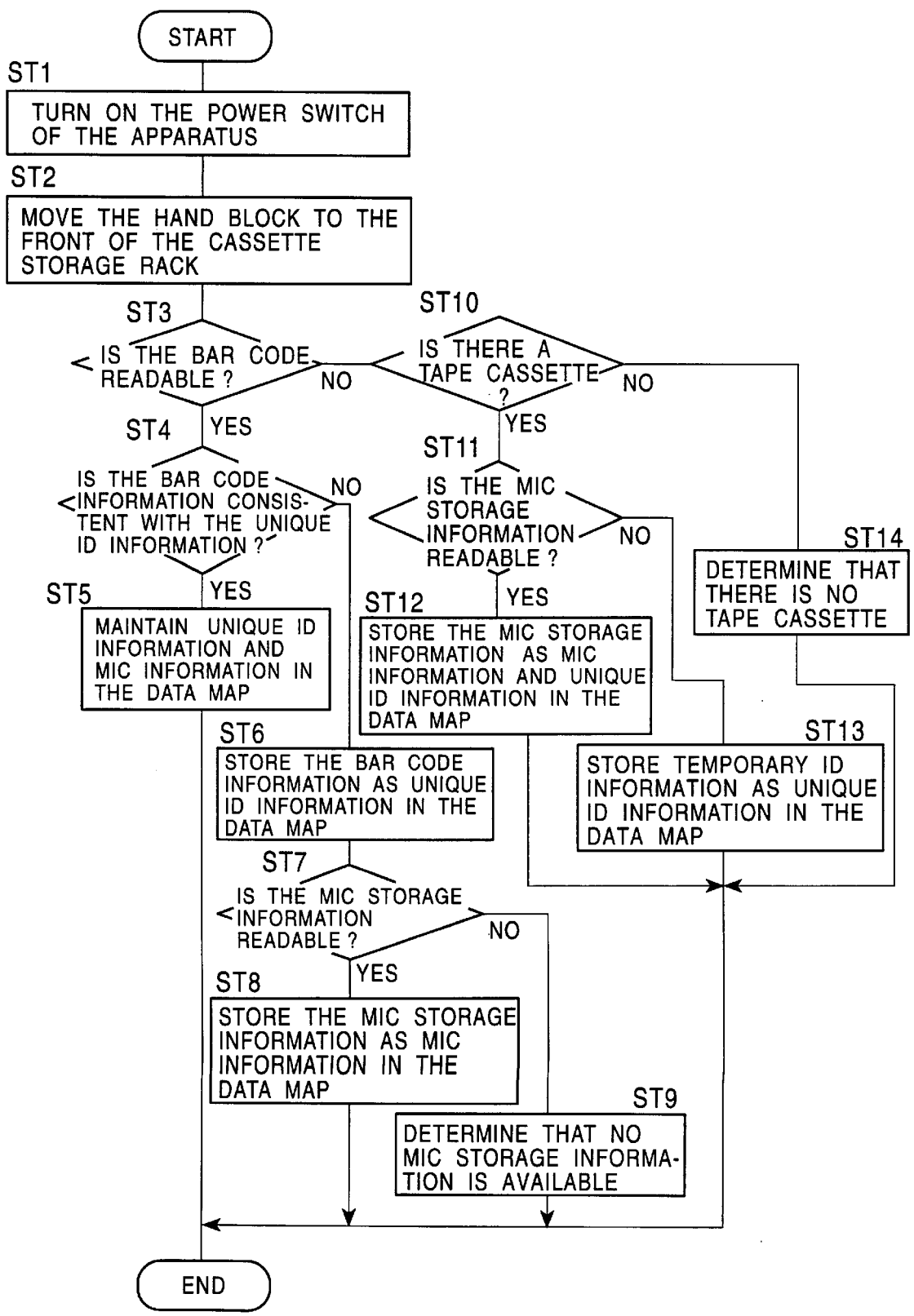
FIG. 14 is a flow chart illustrating the process of obtaining identification information and storing it after the electric power of the system is turned on when the tape library system is started up.

The flow chart shown in FIG. 14 illustrates the process of obtaining the bar code information and the information stored in the MIC 27 after the electric power of the system is turned on. The process described herein is performed by the mechanism controller 50 and the library controller 42.

First, in step ST1, the electric power of the tape library system 29 is turned on. In the next step ST2, the hand block 37 is moved to the cassette storage rack 32 so that the bar code reader 55 and the cassette sensor 61 come to a location in front of a storage location indicated by a particular shelf number.

Then in step ST3, the bar code reader 55 reads the bar code information of a tape cassette. If the bar code information was read successfully, then the process goes to step ST4. However, the process goes to step ST10 if the reading of the bar code information was unsuccessful.

In step ST4, it is determined whether the detected bar code information is identical to the unique identification information which has already been stored in the unique identification information field at the address equal to the shelf number associated with the tape cassette to be identified. If they are identical to each other, then the process goes to step ST6. However, if they are not identical, the process goes to step ST6.

In step ST5, the unique identification information and the MIC information are both maintained unchanged, because no change in the identification information is required.

In step ST6, the bar code information detected in step ST3 is stored in the corresponding unique identification information field of the data map, because the tape cassette is considered to be different from a tape cassette which was taken from the cassette storage location having the same shelf number.

In the next step ST7, the information stored in the MIC 27 of the tape cassette is read. If the information was read successfully, then the process goes to step ST8. However, the process goes to step ST9, if the reading of the information was unsuccessful.

In step ST8, the information which has been read from the MIC 27 in step ST7 is stored as MIC information in the data map.

The process arrives at step ST9, when the reading of information from the MIC is unsuccessful because the tape cassette has some failure in the MIC 27 or because the tape cassette has no MIC. In this case, in step ST9, it is concluded that MIC information is not available, and information indicating that information is unavailable is stored as MIC information in the data map.

In step ST10, it is determined whether there is a tape cassette or not. That is, using the cassette sensor 61, it is determined whether there is a tape cassette at a location indicated by a particular shelf number. If there is a tape cassette, then the process goes to step ST11. However, the process goes to step ST14 if there is no tape cassette at that location.

In step ST11, the information stored in the MIC 27 of the tape cassette is read. If the information was read successfully, then the process goes to step ST12. However, if the information was not read successfully, the process goes to step ST13.

In step ST12, as in step S11 in FIG. 13, the information read from the MIC 27 is stored as MIC information in the data map, and the MIC information is copied into the unique identification information field corresponding to the same shelf number.

In step ST13, as in step S12 in FIG. 13, a temporary identification number is stored in the unique identification information field of the data map, and information indicating that no information is obtained from the MIC is stored in the MIC information field.

In step ST14, it is determined that there is no tape cassette to be identified, and information indicating that there is no tape cassette is written into the data map, or a default value (a predefined default value) is written.

If the above process is completed for all tape cassettes in the cassette storage rack 32, then the data map shown in Table 1 is updated, and the tape cassette management database can be reconstructed using the updated data map.

Although in FIG. 14 the detection as to whether there is a tape cassette is performed in step ST1D, the detection may be performed between steps ST2 and ST3. In this case, when it is determined that there is no tape cassette, it becomes unnecessary to perform the following step of reading bar code information. When such an additional step is interposed, the process flow is modified such that if bar code information is not read at step ST3, the process goes to step ST11.

If the unique identification information and the MIC information are not identical to each other, the MIC information is preferably selected as correct information, as described above. To determine whether the unique identification information and the MIC information are identical to each other, an additional step is interposed between steps ST7 and ST8 in FIG. 14. If it is determined in this additional step that these two pieces of information are identical to each other, then the process goes to step S8. If they are not identical to each other, the information which has been read from the MIC 27 in step ST7 is stored as MIC information field, and the same information is also stored as unique identification information.

Because tape cassettes 24 have both information stored in their own MIC 27 and bar code information which are identical to each other, when some tape cassette 24 is taken out of the tape library system 29, it is possible to read the identification information of that tape cassette using a bar code reader disposed outside the system 29. Even if the bar code information becomes unreadable due to contamination on the bar code label 26 or due to separation of the bar code label 26, it is still possible to quickly and easily obtain the identification information of that tape cassette by reading information, identical to the bar code information, from the MIC 27 using an MIC reader (such as a handy-type reader provided with MIC contact terminals 56) without having to load the tape cassette 24 on a tape drive unit 35.

In the case where bar code information is unreadable due to some reason such as contamination on the bar code label 26, poor or incorrect printing of the label 26, or incorrect placing of the label 26, if the information stored in the MIC 27 is readable, then the unique identification information can be recovered from the MIC information as described in step S11 in FIG. 13 or in step ST12 in FIG. 14. This ensures that the identification information can be managed in a more reliable fashion.

Figure 15:
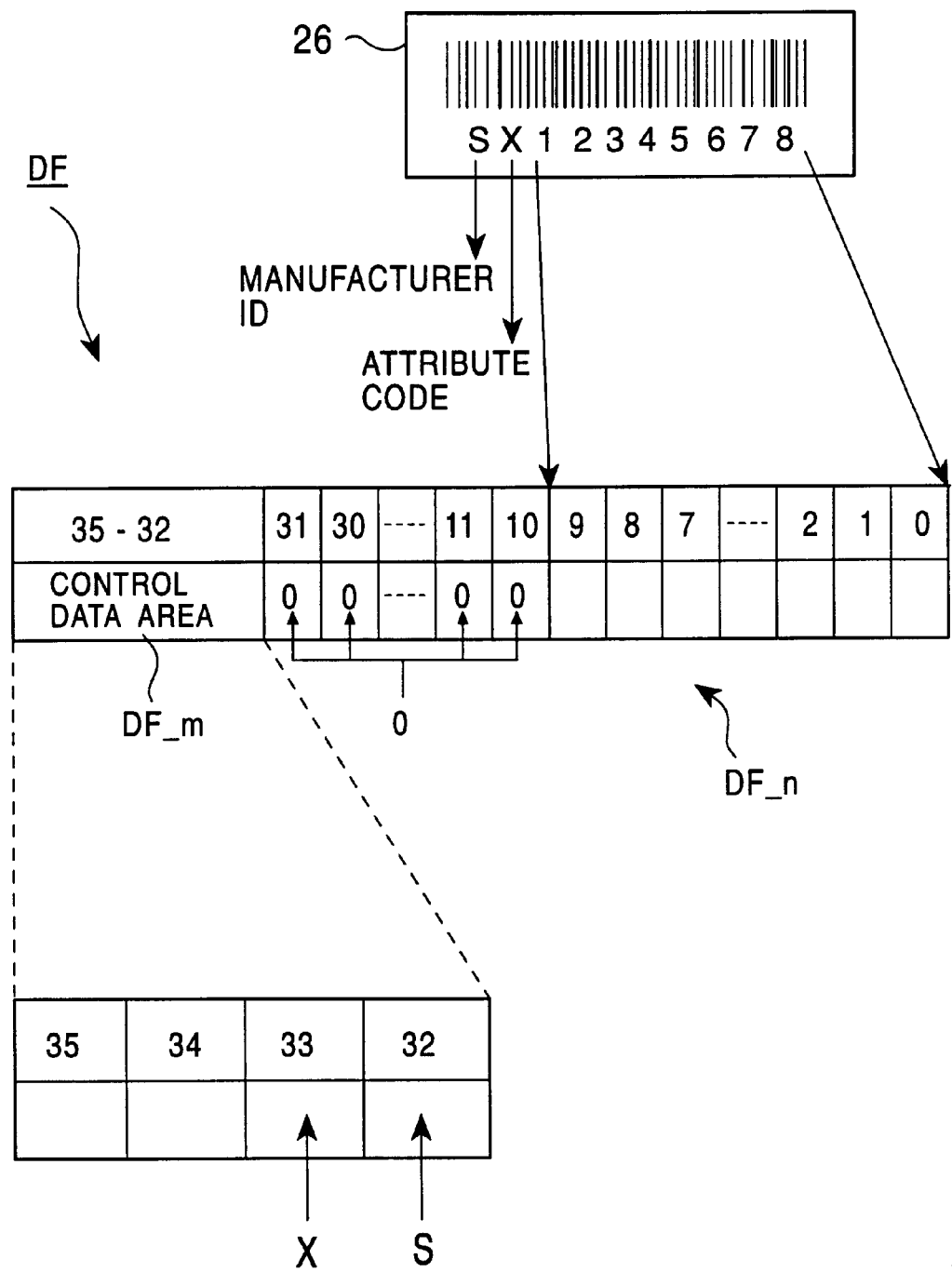
FIG. 15 is a schematic illustration of an example of the data structure of bar code information and MIC data.

FIG. 15 illustrates an example of the data structure of MIC information and bar code information.

Each bar code label 26 includes 10-digit bar information for example "SX12345678" printed on the label 26. The upper two digits "SX" serves as an identification data. More particularly, "S" indicates that the manufacturer is an "S" company. That is, "S" is a manufacturer identification code indicating the manufacturer of a tape cassette. The value of the manufacturer identification code may be assigned in any desired fashion. For example, "B" may be assigned to a "B" company.

"X" is used to represent attribute information such as the type of each tape cassette, the aspect of the physical shape of each tape cassette (for example, availability of identification holes), the format, material, and capacity (length, recording time) of the recording medium of each tape cassette, and the type of the serial number (such as "12345678" following "SX") which corresponds to the unique identification information described above. Hereinafter, "X" is referred to as an attribute code. The value of the attribute code may represent for example whether the tape cassette is a special tape cassette used for testing. The value of the attribute code may also represent the type of each tape cassette, the number of digits of the serial number, or other information.

In contrast, the data form at DF of the MIC 27 includes a greater number of digits than that for the bar code information. For example, the data format DF includes a number area DF_n consisting of 32 lower-order digits and a control data area DF_m consisting of 4 upper-order digits. If each digit includes 1 byte, then DF includes 36 bytes in total. The same information as the lower-order 8-digits of bar code information is represented in a part of the number area DF_n having a greater number of digits than the lower-order 8-digits. For example, the lower-order 8-digits of bar code information is stored in the lower digits of for example of a 10-digit area of DF_n, and the remaining part of the number area DF_n is filled for example with "O" having no particular meaning so that the number stored in the lower digits of the number area DF_n becomes identical to the number printed on the bar code label 26. When bar code information is readable, a higher precedence is given to the bar code information because bar code information can be read quickly. However, when bar code information becomes unreadable, it is recovered by reading information from the MIC 27. In the case where the number of digits of the bar code is not limited to 8, a sufficiently great number of digits of the number area DF_n may be used for the above purpose.

The control data area DF_m includes a storage area for the manufacturer code and a storage area for the attribute code. For example, the 32th digit is used as the storage area for the manufacturer code, and "S" is stored at this digit. On the other hand, the 33th digit may be used as the storage area for storing the attribute code "X".

It is desirable that the meanings of the manufacture code and attribute code be standardized so that different manufacturers may use the apparatus and method without modifications.

If the attribute code is used to represent whether a tape cassette has an MIC 27, and if MIC information in the data map shown in Table 1 includes the attribute code, then it is possible to determine whether the tape cassette has an MIC from the information in the data map without having to read information from the MIC 27.

When it is determined that a tape cassette has an MIC 27 from the value of the attribute code, other information stored in the MIC 27 may be used. That is, the bar code information may be expanded by using information stored in the MIC 27 because the MIC 27 can store a much greater amount of information than the bar code can.

In the above-described specific example of the tape library system 29, the rack number of the cassette storage rack 32 may be stored at a proper storage area (for example some of higher-order digits in the number area DF_n may be used for the purpose instead of storing meaningless 0s) of the MIC of each tape cassette. In the case of a system capable of dealing with a plurality of tape cassettes as groups, the number assigned to each group may be stored in a similar manner. On the other hand, in the case of a backup system, information such as a volume label may be stored in relation to each tape cassette. If such additional information is written in the MIC 27 instead of being written on the magnetic tape 25 of a tape cassette 24, then it is possible to rapidly read desired information as required without having to load the tape cassette 24 on a tape drive unit 35. That is, the reading operation can be performed outside the tape drive unit. This allows a reduction in the frequency of operations of reading information from the magnetic tape, thus preventing the magnetic tape from being degraded or damaged.

What is claimed is:

1. A recording medium cartridge comprising:

a recording medium arranged inside a case of the cartridge;

an identification indicating part provided on an outer surface of the case of the cartridge, wherein the identification indicating part serves to represent identification information for being read by a first reader of a first kind and identifying the recording medium disposed inside the case; and identification information storage means disposed inside the case, the identification information storage means for being read by a second reader of a second kind different than the first kind and for serving to store the same information represented by the identification indicating part.

2. A recording medium cartridge according to claim 1, wherein the identification information indicated by the identification indicating part includes:

one of a manufacturer and attribute information of the recording medium cartridge and also number information uniquely assigned to each recording medium cartridge, and the identification information storage means includes a control data area for storing information which is the same as or equivalent to the manufacturer and attribute information and also includes a number area for storing information which is the same as or equivalent to the number information.

3. A recording medium cartridge according to claim 1, wherein the identification indicating part indicates bar code information, and the identification information storage means includes a memory circuit for storing information which is the same as or equivalent to the bar code information indicated by the identification indicating part.

4. A recording medium cartridge according to claim 3, wherein the bar code information includes the one of the manufacturer and attribute information of the recording medium cartridge and also number information uniquely assigned to each recording medium cartridge, and the memory circuit includes a control data area for storing information which is the same as or equivalent to the control information of the bar code information and also includes a number area for storing information which is the same as or equivalent to the number information of the bar code information.

5. A recording/reproducing apparatus using a recording medium cartridge, the recording medium cartridge including:

identification indicating part provided on the outer surface of a case of the cartridge, the identification indicating part serving to represent identification information for identifying a recording medium disposed inside the case; and identification informations to rage unit disposed inside the case, the identification information storage unit stores information which is the same as or equivalent to the information represented by the identification indicating part, the recording/reproducing apparatus comprising:

first reading means for reading the identification information from the identification indicating part;

second reading means for reading the identification information stored in the identification information storage unit;

recording/reproducing means for recording or reproducing information on or from the recording medium disposed in the recording medium cartridge; and identification information decision means for employing one of the identification information read by the first reading means and the identification information read by the second reading means as the identification information associated with the recording medium in the recording medium cartridge, wherein the identification information decision means employs one of the identification information read by the first reading means and the identification information read by the second reading means as the identification information associated with the recording medium in the recording medium cartridge, before the recording/reproducing means starts to record or reproduce information on or from the recording medium disposed in the recording medium cartridge.

6. The recording/reproducing apparatus according to claim 5, wherein the identification information decision means employs the identification information read from the identification information storage unit via the second reading means as the identification information associated with the recording medium of the recording medium cartridge when the first reading means cannot read the identification information from the identification indicating part.

7. A recording/reproducing apparatus using a recording medium cartridge, the recording medium cartridge including:

an identification indicating part provided on the outer surface of a case of the cartridge, the identification indicating part serving to represent identification information for identifying a recording medium disposed inside the case; and an identification information storage unit disposed inside the case, the identification information storage unit stores information which is the same as or equivalent to the information represented by the identification indicating part, the recording/reproducing apparatus comprising:

first reading means for reading the identification information from the identification indicating part;

second reading means for reading the identification information stored in the identification information storage unit;

recording/reproducing means for recording or reproducing information on or from the recording medium disposed in the recording medium cartridge;

identification information decision means for employing one of the identification information read by the first reading means and the identification information read by the second reading means as the identification information associated with the recording medium in the recording medium cartridge;

first storage means for storing the identification information read by the first reading means;

second storage means for storing the identification information read by the second reading means; and storage control means for controlling the storage of information in such a manner that when the first reading means cannot read the identification information from the identification indicating part, the identification information identical to the identification information, which has been read from the identification information storage unit and stored in the second storage means, is stored in the first storage means.

8. A recording/reproducing apparatus using a recording medium cartridge, the recording medium cartridge including:

an identification indicating part provided on the outer surface of a case of the cartridge, the identification indicating part serving to represent identification information for identifying a recording medium disposed inside the case; and an identification information storage unit disposed inside the case, the identification information storage unit stores information which is the same as or equivalent to the information represented by the identification indicating part, the recording/reproducing apparatus comprising:

first reading means for reading the identification information from the identification indicating part;

second reading means for reading the identification information stored in the identification information storage unit;

recording/reproducing means for recording or reproducing information on or from the recording medium disposed in the recording medium cartridge;

identification information decision means for employing one of the identification information read by the first reading means and the identification information read by the second reading means as the identification information associated with the recording medium in the recording medium cartridge;

first storage means for storing the identification information read by the first reading means;

second storage means for storing the identification information read by the second reading means; and judgment means for comparing the identification information which has been read from the identification indicating part and stored in the first storage means with the identification information which has been read from the identification information storage unit and stored in the second storage means, thereby judging whether these two pieces of identification information are identical, wherein when the judgment means judges that the two pieces of identification information are not identical, identification information decision means employs the identification information obtained via the second reading means as the identification information associated with the recording medium of the recording medium cartridge.

9. A recording/reproducing apparatus using a recording medium cartridge, the recording medium cartridge including an identification indicating part provided on the outer surface of a case of the cartridge, the identification indicating part indicating bar code information for identifying a recording medium disposed inside the case, and an identification information storage unit disposed inside the case, the identification information storage unit serving to store information which is the same as or equivalent to the bar code information indicated by the identification indicating part, the recording/reproducing apparatus comprising:

first reading means for reading the bar code information indicated by the identification indicating part;

second reading means for reading the information stored in a memory circuit of the identification information storage unit;

recording/reproducing means for recording or reproducing information on or from the recording medium disposed in the recording medium cartridge; and identification information decision means for employing either the identification information read by the first reading means or the identification information read by the second reading means as the identification information associated with the recording medium in the recording medium cartridge, wherein the identification information decision means employs one of the identification information read by the first reading means and the identification information read by the second reading means as the identification information associated with the recording medium in the recording medium cartridge, before the recording/reproducing means starts to record or reproduce information on or from the recording medium disposed in the recording medium cartridge.

10. The recording/reproducing apparatus according to claim 9, wherein the identification information decision means employs the identification information read from the memory circuit of the identification information storage unit via the second reading means as the identification information associated with the recording medium of the recording medium cartridge when the first reading means cannot read the bar code information from the identification indicating part.

11. A recording/reproducing apparatus using a recording medium cartridge, the recording medium cartridge including an identification indicating part provided on the outer surface of a case of the cartridge, the identification indicating part indicating bar code information for identifying a recording medium disposed inside the case, and an identification information storage unit disposed inside the case, the identification information storage unit serving to store information which is the same as or equivalent to the bar code information indicated by the identification indicating part, the recording/reproducing apparatus comprising:

first reading means for reading the bar code information indicated by the identification indicating part;

second reading means for reading the information stored in a memory circuit of the identification information storage unit;

recording/reproducing means for recording or reproducing information on or from the recording medium disposed in the recording medium cartridge;

identification information decision means for employing either the identification information read by the first reading means or the identification information read by the second reading means as the identification information associated with the recording medium in the recording medium cartridge;

first storage means for storing the bar code information read by the first reading means;

second storage means for storing the information read from the memory circuit by the second reading means; and storage control means for controlling the storing of information in such a manner that when the first reading means cannot read the bar code information from the identification indicating part, identification information identical to the identification information read from the identification information storage and stored in the second storage means is stored in the first storage means.

12. A recording/reproducing apparatus using a recording medium cartridge, the recording medium cartridge including an identification indicating part provided on the outer surface of a case of the cartridge, the identification indicating part indicating bar code information for identifying a recording medium disposed inside the case, and an identification information storage unit disposed inside the case, the identification information storage unit serving to store information which is the same as or equivalent to the bar code information indicated by the identification indicating part, the recording/reproducing apparatus comprising:

first reading means for reading the bar code information indicated by the identification indicating part;

second reading means for reading the information stored in a memory circuit of the identification information storage unit;

recording/reproducing means for recording or reproducing information on or from the recording medium disposed in the recording medium cartridge;

identification information decision means for employing either the identification information read by the first reading means or the identification information read by the second reading means as the identification information associated with the recording medium in the recording medium cartridge;

first storage means for storing the bar code information read by the first reading means;

second storage means for storing the information read from the memory circuit by the second reading means; and judgment means for comparing the identification information stored in the first storage means with the identification information stored in the second storage means thereby judging whether these two pieces of identification information are identical, wherein when the judgment means judges that the two pieces of identification information are not identical, the identification information decision means employs the information read by the second reading means from the memory circuit as the identification information associated with the recording medium of the recording medium cartridge.

13. An information management system responsive to a command given from an external control device for reproducing information requested by the external control device from a recording medium disposed in a recording medium cartridge and providing the reproduced information to the external control device or responsive to a command given from the external control device for recording information on the recording medium disposed in the recording medium cartridge, the information management system comprising:

a cartridge storage unit for storing a plurality of recording medium cartridges, each of the recording medium cartridges including an identification indicating part provided on an outer surface of a case of the cartridge, the identification indicating part serving to represent identification information for identifying a recording medium disposed inside the case, and an identification information storage unit disposed inside the case, the identification information storage serving to store information which is the same as or equivalent to the information represented by the identification indicating part;

first reading means for reading the identification information of the identification indicating part of each recording medium cartridge;

second reading means for reading the identification information stored in the identification information storage unit of each recording medium cartridge;

identification information decision means which employs the identification information read from the identification information storage via the second information as the identification information associated with the recording medium of the recording medium cartridge when the first reading means cannot read the identification information from the identification indicating part;

recording/reproducing means for recording or reproducing information on or from the recording medium disposed in each recording medium cartridge;

transfer means for taking a desired recording medium cartridge out of the cartridge storage unit and transferring it to the recording/reproducing means; and an insertion slot via which a recording medium cartridge is inserted into the system, wherein if the recording medium cartridge whose identification information has not been identified yet is inserted into the system via the insertion slot, first reading means and second reading means read the identification information from the identification indicating part and from the identification information storage unit, respectively, of the recording medium cartridge, before recording or reproducing information on or from the recording medium of the recording medium cartridge.

14. The information management system according to claim 13, wherein the identification information indicated by the identification indicating part includes control information including one of the manufacturer and attribute information of the recording medium cartridge and also includes number information uniquely assigned to each recording medium cartridge, and the identification information storage unit includes a control data area for storing information which is the same as or equivalent to said control information and also includes a number area for storing information which is the same as or equivalent to the number information.

15. An information management system responsive to a command given from an external control device for reproducing information requested by the external control device from a recording medium disposed in a recording medium cartridge and providing the reproduced information to the external control device or responsive to a command given from the external control device for recording information on the recording medium disposed in the recording medium cartridge, the information management system comprising:

a cartridge storage unit for storing a plurality of recording medium cartridges, each of the recording medium cartridges including an identification indicating part provided on an outer surface of a case of the cartridge, the identification indicating part serving to represent identification information for identifying a recording medium disposed inside the case, and an identification information storage unit disposed inside the case, the identification information storage serving to store information which is the same as or equivalent to the information represented by the identification indicating part;

first reading means for reading the identification information of the identification indicating part of each recording medium cartridge;

second reading means for reading the identification information stored in the identification information storage unit of each recording medium cartridge;

identification information decision means which employs the identification information read from the identification information storage via the second information as the identification information associated with the recording medium of the recording medium cartridge when the first reading means cannot read the identification information from the identification indicating part;

recording/reproducing means for recording or reproducing information on or from the recording medium disposed in each recording medium cartridge;

transfer means for taking a desired recording medium cartridge out of the cartridge storage unit and transferring it to the recording/reproducing means;

first storage means for storing the identification information read by the first reading means from the identification indicating part of each recording medium cartridge;

second storage means for storing the identification information read by the second reading means from the identification information storage unit of the recording medium cartridge;

comparison judgment means for performing judging in such a manner that, when the first or second reading means reads, after the electric power of the system is turned on, identification information from the identification indicating part or the identification information storage unit of a recording medium cartridge stored in the cartridge storage unit, the comparison judgment means compares the identification information with the identification information which has already been stored in the first or second storage means, and judges whether they are identical; and updating means for updating the content of the first or second storage means by the identification information read by the first or second reading means when the comparison judgment means detects inconsistency in the identification information.

* * * * *